Aug. 19, 1952
F. W. COLLIER ET AL
2,607,318
POULTRY FEEDER
Filed Oct. 11, 1951
2 SHEETS—SHEET 2
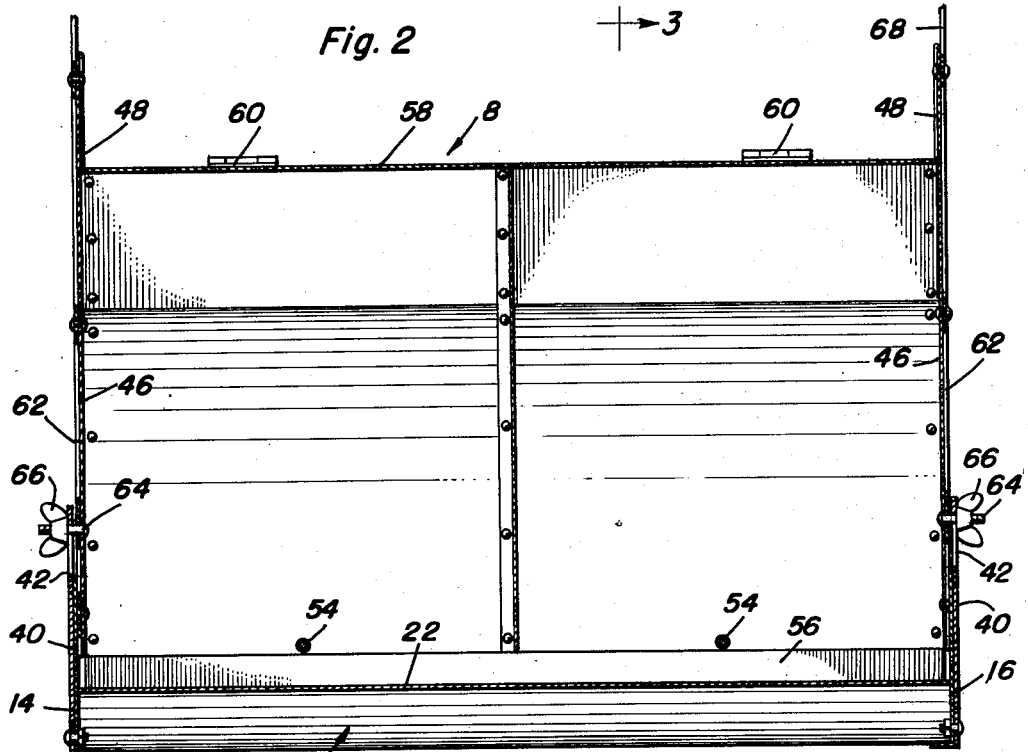
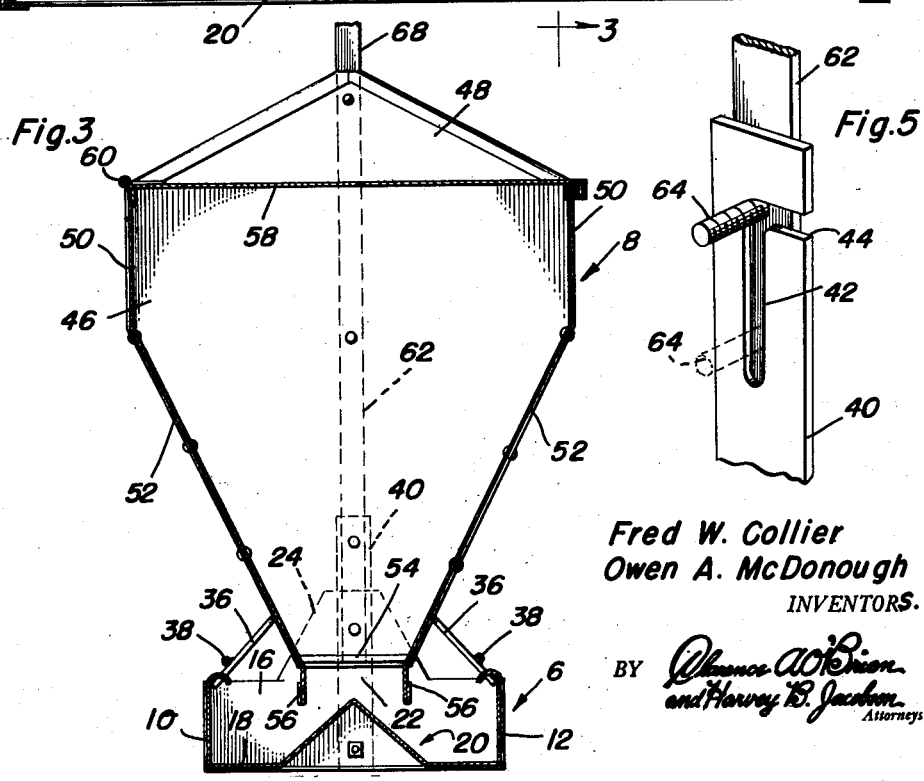
Fred W. Collier
Owen A. McDonough
INVENTORS.

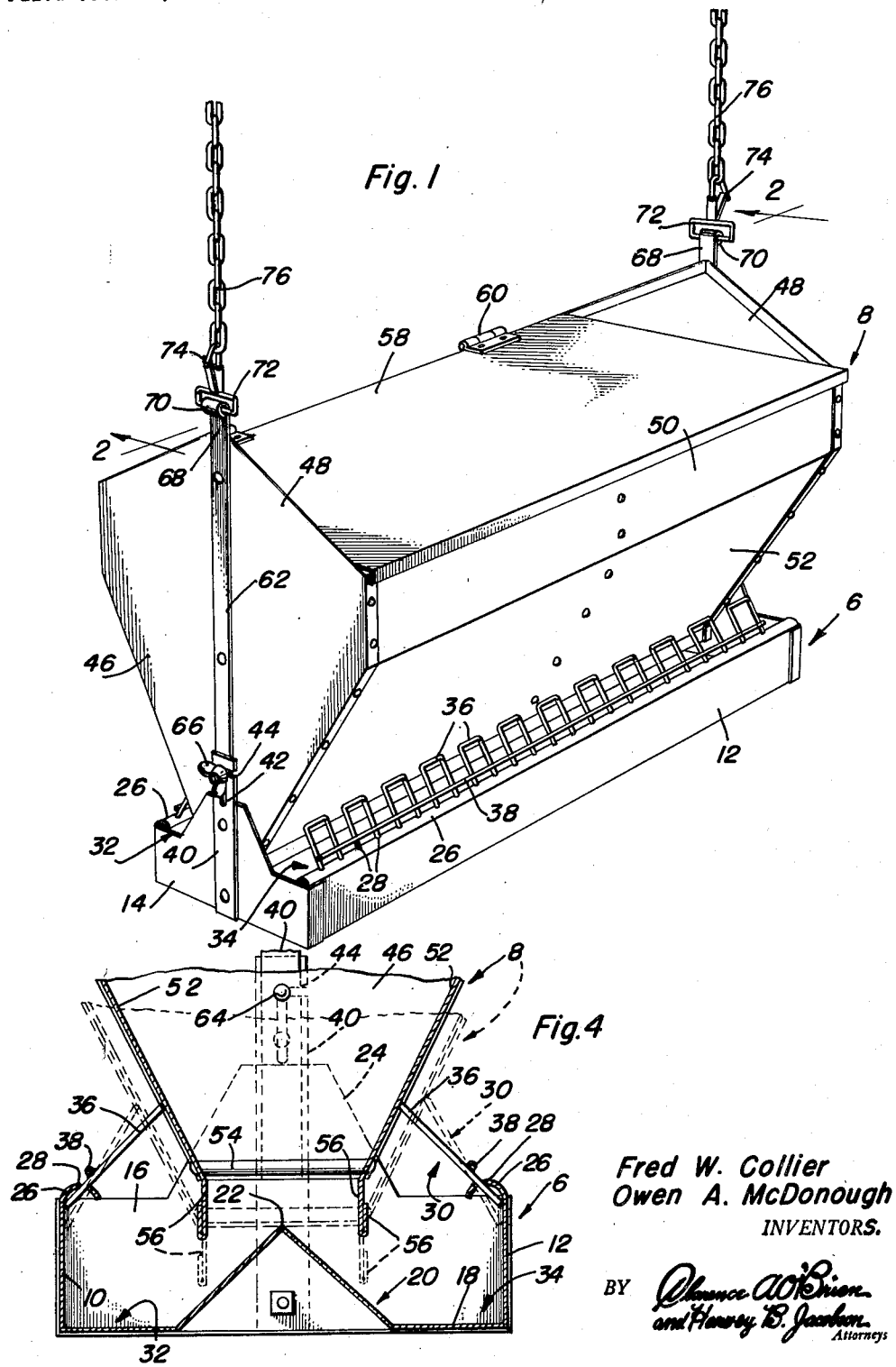

Patented Aug. 19, 1952

2,607,318

UNITED STATES PATENT OFFICE 2,607,318

POULTRY FEEDER

Fred W. Collier and Owen A. McDonough,
Dardanelle, Ark.

Application October 11, 1951, Serial No. 250,878

3 Claims. (Cl. 119—53)

1

The present invention relates to certain new and useful improvements in feeders for poultry and the like and has more particular reference to a feeder construction which is characterized by a trough unit and a complemental hopper unit, the latter being adapted to contain the feed and to discharge same under the forces of gravity into the trough unit for readily accessible consumption by the users.

As the preceding statement of the invention implies, it is old in the art to construct a feeder along the lines described and, in addition, it is admittedly old to associate the discharge slot means at the botom of the hopper with a deflecting and distributing rib in the receiver for purposes of manually regulating the flow of the feed from the hopper into the troughs. It follows, therefore, that the instant invention has to do with specific structural improvements with a view toward providing a more satisfactory and acceptible construction which, it is believed, better fulfills the respective requirements of manufacturers and poultry-men alike.

More specifically, a further improvement has to do with a trough unit whose bottom is provided with a longitudinal centrally disposed V-shaped rib or the equivalent member which serves to divide and deliver the down-flowing feed into the respective troughs for consumption, the special structural arrangement being novel in that the discharge end or portion of the hopper has depending spaced parallel skirt or apron portions which when adjusted toward and from the sloping surfaces of the V-shaped member provide the desired regulating and valving action.

Another object of the invention has to do with a manually regulatable hopper and pan combination wherein both the pan and hopper have overlapping connecting and adjusting straps which assist in properly assembling the units and also in enabling the user to make the desired adjustments with the least possible difficulty.

Another object of the invention appertains to the use of straps for connecting the hopper and trough units adjustably, the straps on the hopper projecting at their upper ends above the corresponding portion of the hopper where they are provided with hingedly attached snap fasteners, the latter serving to accommodate suspension chains and said chains being used to hoist and locate the entire feeder in a plane elevated above the ground or other support.

Another object of the invention pertains to a trough unit characterized by the stated pan wherein the longitudinal side walls of the pan have their upper edges directed inwardly toward

2 each other and formed into flanges, the flanges overhanging the troughs and providing splash guards and, in addition, serving as supports for readily attachable and detachable trough guards which latter permit the chickens to eat without too much restriction but prevent them from actually getting into the feed in the trough and in this manner contaminating it.

A somewhat general but nevertheless important object of the invention is to improve upon and reduce the number of parts entering into the over-all combination, thereby not only increasing the efficiency of the structure as a whole, but rendering the same less costly to manufacture and to otherwise simplify factors of assembling and sale.

Other objects and advantages will become more readily apparent from the following description and the accompanying sheet of illustrative drawings.

In the accompanying drawings wherein like numerals are employed to designate like parts throughout the views:

Figure 1 is a perspective view of a poultry feeder constructed in accordance with the principles of the present invention;

Figure 2 is an enlarged section on the line 2—2 of Figure 1, looking in the direction of the arrows;

Figure 3 is a cross-section on the vertical line 3—3 of Figure 2;

Figure 4 is a fragmentary enlarged sectional view of the lower portion of Figure 3 illustrating the adjustment of the trough unit relative to the hopper unit, and Figure 5 is an enlarged fragmentary perspective view of the adjustable strap means later to be described.

Referring now to the drawings with reference numerals and accompanying lead lines, the base or trough unit is denoted by the numeral 6 and the complemental hopper unit by the numeral 8. They are both of sheet material construction and of general rectangular form. As before mentioned, the trough unit 6 is characterized by rectangular sheet metal or equivalent pan of appropriate depth and capacity. It embodies spaced parallel longitudinal side walls 10 and 12, transverse connecting end walls 14 and 16 and a bottom wall 18. The latter wall is indented or otherwise formed into an inverted V-shaped rib 20 constituting a feed dividing, spreading and deflecting member. The ridge or vertex of this is denoted by the numeral 22 in Figure 4. The end walls have truncated triangular extensions 24. The upper ends of the longitudinal side walls are provided with laterally inbent portions 26—26 constituting over-hanging flanges. In addition, these are useful as anti-spilling guards. Then, too, the flanges are formed with elongated apertures 28 which, as shown in Figures 1 and 2, serve to accommodate the readily attachable and detachable wire or equivalent grating 30. This grating is used as a guard and serves to prevent the chickens from climbing into the feed in the respective troughs 32 and 34. More specifically each grating comprises a plurality of U-shaped wires 36 joined together by a single connecting rod or wire 38. The free end portions of the U-shaped wires 36 are fitted removably in coacting apertures 28 provided therefor in the guard flange 26. The guard or grating 30 is commensurate in length with the guard flange on which it is separably mounted. Rigid metal straps 40—40 are secured to the transverse ends 14 and 16 and have upper end portions connected with the truncated triangular extensions 24 and extending above the latter, the extending ends each having a bayonet slot. Actually the slot means is of L-shape form and the long vertical branch is denoted by the numeral 42 and the shorter branch by the numeral 44, the latter opening through the edge of the strap.

The hopper unit has its open bottom portion removably and telescopically received in the pan between the respective end walls of the pan. Said hopper unit embodies vertical end walls 46—46 with triangular extensions 48—48 on their upper ends. Their longitudinal side walls are joined suitably with the end walls and these have upper portions 50—50 and lower inwardly slanting or converging portions 52—52. Suitable spacers 54 are bolted or otherwise secured between the lower end portions of the converging walls 52—52 as best shown in Figure 4 and these lower ends have depending spaced parallel extensions 56—56 which latter constitute feed regulating aprons or skirts. The latter elements are coextensive in length with the opening means at the bottom of the hopper and they actually straddle the ridge 22 of the V-shaped mound or member 20 and they coact with the slanting walls and provide the desired valving and controlling result. The lid or cover is flat and this is denoted by the numeral 58, the same being hinged along one longitudinal edge as at 60—60. Rigid metal straps are superimposed against and riveted to the ends or end walls 46—46 and the straps are denoted at 62 and their lower ends are overlapped by the slotted upper ends of the aforementioned metal straps 40—40. Said lower ends are provided with bolts 64 carrying wing nuts 66, the bolts and wing nuts being associated with the slot means to thus separably and adjustably join the respective straps 40 and 62 together, to thus assemble the hopper unit in the trough unit and to permit the two units to be adjusted toward and from each other to regulate the opening means between the discharge slot of the hopper and the divider rib or member 20.

The upper end portions of the longer straps 62—62 extend as at 68 above the end wall extensions 48 where they are bent upon themselves to form hinging knuckles 70—70 each knuckle serving to accommodate a buckle 72 carrying a snap fastener 74 to which the links of a suspension chain 76 may be connected. After the chains have been snapped in place it is obvious that the overall feeder may be suspended at a desired elvation above the ground or other underlying supporting surface.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A feeder comprising a trough unit embodying a pan having interconnected bottom, side and end walls, said bottom wall having an indentation extending centrally and longitudinally thereof and providing a V-shaped flow spreading and deflecting member, said member dividing said pan into selectively usable feed troughs, rigid metal straps superimposed against and secured to the end walls of the pan and having upper ends projecting beyond corresponding upper ends of said end walls, said upper ends being provided with bayonet slots, a hopper unit having slot means at its bottom situated within the marginal limits of said pan, said hopper unit embodying a hopper having vertical end walls slidably contacting the vertical end walls in the pan, additional straps secured to the end walls of the hopper and having their lower ends in underlapping relation with the first named straps and provided with bolt and nut means cooperable with said bayonet slots, whereby to separably and adjustably unite the trough and hopper units, the upper edges of the side walls of said pan having inturned curved flanges overhanging the respective troughs, said flanges being provided with apertures, and readily attachable and detachable open-work gratings bridging the open portions of the troughs and resting against the side walls of the hopper unit and having members detachably and adjustably connected with the apertures in said flanges.

2. The structure specified in claim 1 wherein the second named straps have their upper ends extending above the corresponding ends of the hopper unit and provided with hingedly attached snap hooks, said snap hooks being adapted to accommodate the suspension chains.

3. The structure specified in claim 1 wherein each grating comprises a plurality of U-shaped wire members and a rod connecting said members together in longitudinally spaced row alignment.

FRED W. COLLIER.
OWEN A. McDONOUGH.

REFERENCES CITED

The following references are of record in the file of this patent:

UNITED STATES PATENTS

| Number | Name | Date |
|---|---|---|
| 366,933 | Cowan | July 19, 1887 |
| 581,120 | Johnson | Apr. 20, 1897 |
| 1,106,547 | Crabill | Aug. 11, 1914 |
| 1,569,931 | Herrington | Jan. 19, 1926 |
| 1,593,705 | Nebergall | July 27, 1926 |
| 1,656,061 | Hall | Jan. 10, 1928 |
| 2,543,916 | Lewis | Mar. 6, 1951 |

FOREIGN PATENTS

| Number | Country | Date |
|---|---|---|
| 23,153 | Denmark | May 30, 1918 |